United States Patent [19]
Carpenter et al.

[11] Patent Number: 5,118,047
[45] Date of Patent: Jun. 2, 1992

[54] OSCILLATOR SLIDER RETAINER LOCK

[75] Inventors: Robert L. Carpenter; John A. Zurcher, both of Tulsa, Okla.

[73] Assignee: Zebco Corporation, Tulsa, Okla.

[21] Appl. No.: 527,516

[22] Filed: May 23, 1990

[51] Int. Cl.$^5$ .......................................... A01K 89/01
[52] U.S. Cl. .................................... 242/241; 403/379
[58] Field of Search ............... 242/241, 242; 403/378, 403/379

[56] References Cited

U.S. PATENT DOCUMENTS

| | | | |
|---|---|---|---|
| 3,033,486 | 5/1962 | Wood | 242/242 X |
| 3,946,963 | 3/1976 | Oberg | 242/246 |
| 4,196,869 | 4/1980 | Shepherd | 242/230 |
| 4,428,544 | 1/1984 | Councilman | 242/242 |
| 4,491,285 | 1/1985 | Councilman | 242/242 |
| 4,773,611 | 9/1988 | Kaneko | 242/241 |
| 4,927,094 | 5/1990 | Henriksson | 242/242 |

FOREIGN PATENT DOCUMENTS 210282  9/1957  Australia .................. 242/241

Primary Examiner—Katherine Matecki
Attorney, Agent, or Firm—Wood, Phillips, VanSanten, Hoffman & Ertel

[57] ABSTRACT

An improved fishing reel of the type having a fixed frame/housing, a line carrying spool, a rotor for directing line onto the spool as the rotor is operated, structure for mounting the spool for reciprocating movement as the rotor is operated to cause even distribution of line on the spool during line retrieval, a reciprocating shaft for effecting reciprocating movement of the spool, a slider block movable with the reciprocating shaft, a rotatable crank handle for operating the rotor, and structure for converting rotary motion of the crank handle into reciprocating movement of the slider block and in turn the shaft and spool. The improvement relates to structure for connecting the slider block to the reciprocating shaft, which structure consists of alignable openings in each of the slider block and shaft, a locking pin having a head and a body with the body being extendable by movement in a first direction through the aligned openings in the slider block and shaft into assembled position with the head in a first orientation so that the pin body holds the slider block and shaft in operative relationship, and structure on the block for cooperating with the pin head in a second orientation for preventing the pin from moving out of its assembled position by movement oppositely to the first direction.

14 Claims, 1 Drawing Sheet

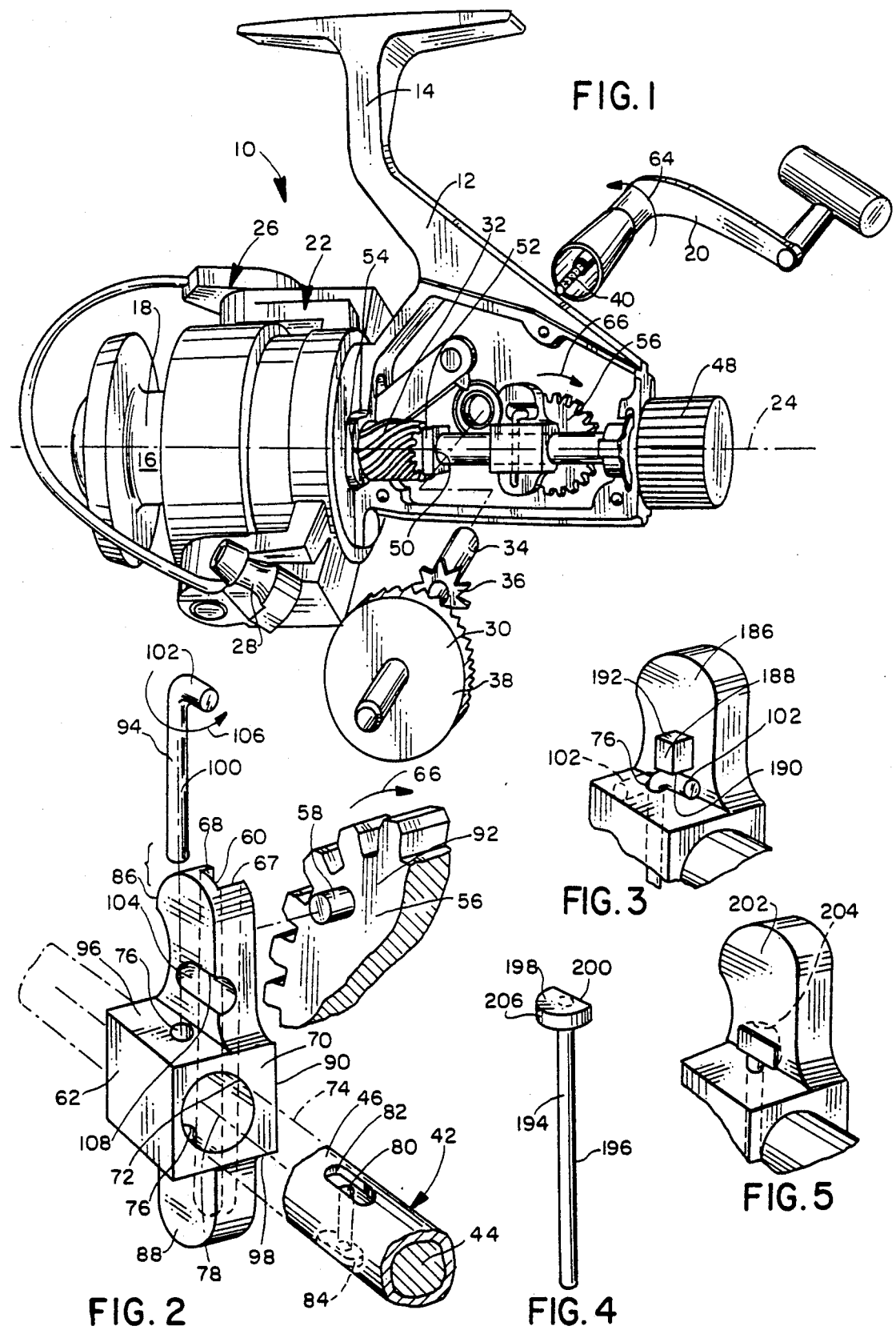

OSCILLATOR SLIDER RETAINER LOCK

BACKGROUND OF THE INVENTION

1. Field of the Invention

This invention relates to spinning-style fishing reels and, more particularly, to a structure and method for releasably securing a slider block to a reciprocating/oscillating shaft mounting a line-carrying spool.

2. Background Art

It is known to construct spinning reels with a spool that reciprocates as a rotor is operated to direct line onto the spool so that the line is evenly distributed as it is retrieved. In one known construction, a center shaft is attached to the spool and carries a slider block. The slider block is operatively connected to a drive mechanism that is operated by the crank handle to move the slider block and, in turn, the center shaft and spool in the desired reciprocating path. Heretofore, the attachment of the slider block to the center shaft has generally been accomplished by a delicate, time-consuming and consequently costly process which has caused reel designers to search for alternative mechanisms to connect a center shaft to a drive mechanism therefor.

One known method of accomplishing this is to crimp the slider block to the center shaft so that it is, in effect, permanently assembled. This creates a problem because the slider block then prevents separation of the center shaft from the reel housing, as when repairs are to be made.

Another example of a prior art structure is shown in U.S. Pat. No. 4,196,869, to Shepherd. In Shepherd, a U-shaped yoke straddles the center shaft. A locking pin is extended through the legs of the U and the center shaft therebetween to maintain the yoke and center shaft operatively connected. Provision must be made to prevent the locking pin from withdrawing. The structure is quite complicated and difficult to assemble.

Another known method of connecting a drive element to a center shaft is shown in U.S. Pat. No. 3,946,963, to Oberg. Oberg employs a screw extending into the center shaft to hold a link on the center shaft for reciprocatively driving the center shaft. In addition to requiring a very difficult assembly step, the screw on the mechanism in Oberg is prone to working loose, which would cause the drive link to disengage and result in reel malfunction.

SUMMARY OF THE INVENTION

The present invention is specifically directed to overcoming the above-enumerated problems in a novel and simple manner.

The present invention is directed to an improvement in a fishing reel of the type having a fixed frame/housing, a line carrying a spool, a rotor for directing line onto the spool as the rotor is operated, structure for mounting the spool for reciprocating movement as the rotor is operated to cause even distribution of line on the spool during line retrieval, a reciprocating shaft for effecting reciprocating movement of the spool, a slider block movable with the reciprocating shaft, a rotatable crank handle for operating the rotor, and structure for converting a rotary motion of the crank handle into reciprocating movement of the slider block and in turn the shaft and spool. The improvement relates to structure for connecting the slider block to the reciprocating shaft, which structure consists of alignable openings in each of the slider block and shaft, a locking pin having a head and a body with the body being extendable by movement in a first direction through the aligned openings in the slider block and shaft into assembled position with the head in a first orientation so that the pin body holds the slider block and shaft in operative relationship, and structure on the block for cooperating with the pin head in a second orientation for preventing the pin from moving out of its assembled position by movement oppositely to the first direction.

With the invention structure, as assembler can direct the body of the pin through the aligned openings in the slider block and shaft with the head in the first orientation and, upon the assembled position being realized, reposition the head in the second orientation to prevent inadvertent withdrawal of the pin.

With the inventive structure, the assembly of the slider block is simplified, assembly steps can be performed by hand, and the slider block is positively and safely held in position on the center shaft.

Various configurations for the pin are contemplated by the invention. In one configuration, the pin is L-shaped. Another preferred form of the pin is an elongate body with an enlarged head or offset.

With the inventive structure, the head or offset on the body, with the pin head in its second orientation, interferes with a confronting shoulder on the block to prevent movement of the pin out of its operative position. The present invention contemplates several different structures to define the shoulder on the slider block. In one version, a recess is provided in the block and is bounded by the shoulder. The head/offset is moved into the recess and facing relationship with the shoulder as it realizes its second orientation.

In an alternative design, a boss/enlargement is provided on the slider block and defines the shoulder.

In a preferred form, the pin body is elongate with the head being non-symmetrical about the length of the pin body. The pin is rotated about the lengthwise axis of the body to reposition the head between the first and second orientations.

In one form of the invention, the head has a curved surface traced by an arc centered on the lengthwise axis of the pin and the slider block has a curved seat to substantially match to the curved head surface. The first surface thus cams into the slot as the head is moved from its first to its second orientation by rotation about the length of the pin.

The invention is also directed to a method of assembling the slider block to a shaft consisting of the steps of: providing openings in the slider block and shaft, providing a pin with a body and head, aligning the openings in the slider block and shaft, directing the pin body through the aligned openings in the slider block and shaft into assembled position, and turning the pin into a locked position so that the pin head orients with respect to the shoulder so as to interfere therewith in the event that one attempts to move the locking pin out of its assembled position.

BRIEF DESCRIPTION OF THE DRAWINGS

FIG. 1 is a perspective view of a fishing reel with a slider block retaining structure according to the present invention incorporated therein;

FIG. 2 is an enlarged, exploded, perspective view of the inventive slider block retaining structure with a preferred form of slider block and a locking pin therefor in an assembly/disassembly orientation;

FIG. 3 is a view as in FIG. 2 with a modified form of slider block and with the locking pin in its locked position;

FIG. 4 is a perspective view of a modified form of locking pin according to the present invention; and FIG. 5 is a view as in FIG. 3 with the pin in its locked position on a modified form of slider block.

DETAILED DESCRIPTION OF THE DRAWINGS

An exemplary spinning-style reel, suitable for incorporation of the present invention, is shown at 10 in FIG. 1. The reel 10 consists of a fixed frame/housing 12 with a mounting stem 14 for attachment to a fishing rod (not shown). The forward portion of the reel 10 has a spool 16 with a hub 18 about which a supply of line can be wound.

A crank handle 20 is operable to drive a rotor assembly 22 about a fore and aft axis 24 for the reel 10. The rotor assembly 22 includes a bail mechanism 26 with a line guide 28 which continuously draws the line around the hub 28 as the rotor assembly 22 is operated. The crank handle 20 effects rotation of the rotor assembly 22 through a crank gear 30 and a cooperating spiral gear 32.

The crank gear 30 has a laterally extending shaft 34 with an integral oscillator drive gear 36 and a face gear 38, with the latter meshing with and driving the spiral gear 32 in operation. The crank handle 20 has a stem 40 which threads into the shaft 34 so that the shaft 34 and crank handle 20 rotate as a unit.

As seen in FIGS. 1 and 2, the spool 16 is carried by a center shaft 42, consisting of an inner core shaft 44 and a surrounding sleeve 46. The core shaft 44 extends forwardly through the rotor assembly 22 and, at its forward free end, mounts the spool 16. The shaft 44 extends rearwardly into a drag knob 48, which is secured to the frame/housing 12 for conventional drag control by rotation thereof about the fore and aft axis 24 of the reel 10.

The sleeve 46 extends through a fore and aft bore 50 in a mounting boss 52 on the frame/housing 12 at the mid portion of the sleeve 46. The forward end of the sleeve 46 extends into the rotor, while the rear end of the sleeve 46 extends into the drag knob 48. The spiral gear 32 surrounds the sleeve 46, and is secured to rotate with the rotor assembly 22, and is captively maintained in a fore and aft direction between the mounting boss 52 and a plate 54 behind the rotor assembly 22 and fixed to the housing 12.

The present invention is concerned with the structure for converting rotary movement of the crank handle 20 into reciprocating/oscillating fore and aft movement of the center shaft 42. This is accomplished through the gear 36, which meshes with and rotates a driven oscillator gear 56 about a lateral axis parallel to the rotary axis of the crank handle 20. The gear 56 has an integral, laterally projecting drive pin 58 which moves in a vertical slot 60 on a slider block 62 on the center shaft 42.

Forward rotation of the crank handle 20, in the direction of arrows 64 in FIG. 1, causes clockwise rotation of the driven oscillator gear 56, as indicated by arrows 66 in FIGS. 1 and 2. As this occurs, the pin 58 in the slot 60 bears against the forwardly facing wall 67 bounding the slot 60 and progressively urges the slider block 62 and center shaft 42 in a rearward direction until the pin 58 realizes approximately a three o'clock position, representing the rearwardmost position for the slider block 62. Further forward rotation of the crank handle 20 brings the pin 58 against the rearwardly facing surface 68 bounding the slot 60 and in so doing progressively drives the slider block 62 forwardly until the pin travels through 180° to the nine o'clock position at which time it separates from the rearwardly facing surface 68 and re-engages the forwardly facing surface 66. The nine o'clock position for the pin 58 represents the forwardmost position of the slider block. As the slider block 62 shifts forwardly and rearwardly, it draws with it the center shaft 42, as will be described below.

The slider block 62 has a squared body 70 with a fore and aft through bore 72 to closely surround the outer surface 74 of the sleeve 46. The body 70 is sufficiently loose on the sleeve 46 that it can be readily moved by an assembler lengthwise relative thereon during manufacture.

An opening 76 bored through the body 70 is coincident with the central axis 78 of the bore 72 and center shaft 42. A through bore/opening 80 with substantially the same diameter as the opening 76, is drilled through the core shaft 44 and coincides with the axis 78. An oval bore 82, that is elongate in the fore and aft direction, is provided through the top of the sleeve 46 with a like oval bore 84 provided through the bottom of the sleeve 46 in vertical alignment with the bore 82. The oval bores 82, 84 register with the through bore/opening 80 and maintain this registration through a limited range of relative fore and aft movement between the core shaft 44 and sleeve 46, the significance of which will be described below.

The slider block 62 consists of a squared body 70 and an integral ear 86 extending vertically upwardly from the body 70 and an integral ear 88 extending vertically downwardly from the block 70. The block 70 and ears 86, 88 cooperatively define a flat, laterally facing wall 90 on which the slot 60 is defined.

To effect assembly of the slider block 62, the slider block wall 90 is placed facially against the flat, facing surface 92 of the gear 56 with the pin 58 extended into the slot 60. The center shaft 42 is then directed through the bore 72 in the body 70 and operatively connected with the rotor assembly 22, spiral gear 32 and drag knob 48. The slider block 62, core shaft 44 and sleeve 46 are relatively positioned so that the openings 76, 80 and bores 82, 84, are in vertical registration. A locking pin 94, oriented as in FIG. 2, is then directed downwardly consecutively through the opening 76 in the top wall 96 of the body 70, the oval bore 82, through bore 80, oval bore 84, and opening 76 in the bottom wall 98 of the body 70.

Once the locking pin 94 is directed downwardly into its assembled position, the elongate body 100 of the pin 94 prevents the block 70 from shifting longitudinally or rotating relative to the core shaft 44. This represents the operative/assembled position for the slider block 62. The oval bores 82, 84 permit a limited range of fore and aft shifting between the sleeve 46 and core shaft 44 to allow operation of a drag system, operable through the drag knob 48.

To prevent withdrawal of the pin 94 from its assembled position, an offset head 102 is provided. The head 102 is configured to move into a slot 104, defined in the vertically extending ear 86 on the slider block 62, by turning of the pin 94 approximately 90° about the vertical axis of the pin body 100. The head, shown in a first orientation in FIG. 2, slides freely past the vertical gear 86. Upon the head 102 vertically coinciding with the slot 104, the pin 94 can be pivoted in the direction of arrow 106 through 90°, to situate the head 102 in a second/locking orientation within the slot 104. A downwardly facing shoulder 108 bounding the slot 104 blocks upward movement of the head 102 with the head in its second, locked orientation.

In FIG. 3, a modified form of locking mechanism is disclosed. The corresponding vertically extending ear 186 has, instead of a slot 104, a block/boss 188 defining a downwardly facing shoulder 190. The block 188 is offset rearwardly from the opening 76 so that with the pin head 102 turned to its first, phantom orientation in FIG. 3, the pin head 102 can be directed downwardly past the forwardly facing surface 192 on the block 188 without interference. Once the head 102 is directed downwardly to the position wherein it abuts the body 70, it can be turned through 90° to the solid line position in FIG. 3 to put the head 102 and shoulder 190 in facing-/locking relationship.

A still further alternative form of the locking structure, according to the present invention, is shown in FIGS. 4 and 5. The pin 194 has an elongate body 196, as in the prior embodiment, and an enlarged head 198 with a generally disc-shaped configuration that is cut off to define a flat edge 200. The vertical ear 202 has a curved slot 204 to accept the head 198. The pin head 198 has a curved surface 206 which is pivoted into the slot 204 with the head 198 and slot 204 in vertical coincidence. The flat edge 200 allows the head 198 to move vertically downwardly past the ear 202 without interference. Once the head 198 is aligned with the slot 204, the pin 194 is rotated about its vertical axis through approximately 180° to progressively cam the surface 206 into the slot 204. The invention contemplates that the curvatures of the surface 206 and slot 204 be either matched or slightly mismatched so that there is a binding cam action which results to more positively hold the pin 194 in its assembled position.

It can be seen that with the inventive structure, the pins 94, 194 can, during assembly, be simply directed downwardly through the slider block 62 and center shaft 42 whereupon a simple, partial turn of the pin 94, 194 effects positive locking thereof. The assembly process is extremely simple, yet the pin 94, 194 is safely and positively held in place to prevent inadvertent disassembly thereof.

The foregoing disclosure of specific embodiments is intended to be illustrative of the broad concepts comprehended by the invention.

We claim:

1. In a fishing reel of the type having a fixed frame/housing, a line carrying spool, a rotor for directing line onto the spool as the rotor is operated, means for mounting the spool for reciprocating movement as the rotor is operated to cause even distribution of line on the spool, a reciprocating shaft for effecting reciprocating movement of the spool, a slider block movable with the reciprocating shaft, a rotatable crank handle for operating the rotor, and means for converting rotary motion of the crank handle into reciprocating movement of the slider block and in turn the shaft and spool, improved means for connecting the slider block to the reciprocating shaft comprising:

alignable openings in each of said slider block and shaft;

a locking pin having a head and a body with the locking pin body extended into the openings in each of the slider block and shaft in its assembled position, said body being extendable by movement in a first direction through the openings in the slider block and shaft into assembled position with the head in a first orientation, said pin body, with the pin in its assembled position, holding the slider block and shaft in operative relationship; and means on the slider block cooperating with the pin head with the pin head in a second orientation for preventing the pin from moving out of its assembled position by movement oppositely to said first direction, whereby an assembler can direct the pin body through the aligned openings in the slider block and shaft with the pin head in its first orientation and, upon the assembled position for the pin being realized, reposition the pin head in said second orientation to prevent inadvertent withdrawal of the pin.

2. The improved slider block connecting means according to claim 1 wherein the pin is L-shaped.

3. The improved slider block connecting means according to claim 1 wherein the pin body is elongate and the head comprises an offset from the length of the body.

4. The improved slider block connecting means according to claim 1 wherein the pin body is elongate and the head comprises an enlargement on the pin body.

5. The improved slider block connecting means according to claim 1 wherein said block has a recess bounded by a shoulder into which said head extends with the pin in its assembled position and the pin head in its second orientation, said shoulder interfering with said head to prevent movement of said pin out of said assembled position.

6. The improved slider block connecting means according to claim 1 wherein said slider block has a boss therein defining a shoulder which interferes with said head in said second orientation to prevent movement of said pin out of its assembled position.

7. The improved slider block connecting means according to claim 1 wherein said pin body is elongate and has a lengthwise axis and the pin body is rotatable about said lengthwise axis to move said pin head between said first an second orientations.

8. The improved slider block connecting means according to claim 7 wherein said head has a curved surface traced by an arc centered on said lengthwise axis and the slider block has a curved seat bounded by a shoulder and matched substantially to the curved head surface so that an assembler can rotate the head about the lengthwise axis to situate the head in its second orientation wherein the shoulder bounding the seat interferes with the head to prevent inadvertent movement of the pin out of its assembled position.

9. A structure for attaching a slider block to a reciprocating shaft on a fishing reel to cause the slider block to follow reciprocating movement of the shaft, said attaching structure comprising:

a shoulder on said slider block;

a locking pin with a body and a head;

alignable openings in each of said slider block and shaft, said pin body extending through the openings in the slider block and shaft in an assembled position in which the pin body holds the slider block and shaft in an operative relationship;

said pin being movable with the pin body in its assembled position between a) a first orientation wherein the pin body can be placed into and withdrawn from its assembled position without interference between the pin head and slider block shoulder and b) a second orientation wherein the pin head interferes with the slider block shoulder to prevent withdrawal of the pin body from its assembled position.

10. The slider block attachment structure according to claim 9 wherein there is a recess in said slider block which is bounded by said shoulder.

11. The slider block attachment structure according to claim 9 wherein there is a boss on said slider block defining said shoulder.

12. The slider block attachment structure according to claim 9 wherein the locking pin comprises an L-shaped member.

13. The slider block attachment structure according to claim 9 wherein said locking pin comprises an elongate body with an enlarged head thereon.

14. A method of assembling a slider block with a shoulder thereon to a shaft on a fishing reel, comprising the steps of:

providing openings in each of the slider block and shaft;

providing a pin with an elongate body and a head;

aligning the openings on the slider block and shaft;

placing the pin head in a first orientation;

directing the pin body with the pin head thereon in said first orientation through the aligned openings in the slider block and shaft into assembled position by translation of the pin body without rotation thereof in a first direction in a line substantially parallel to its length; and turning the pin head to a second orientation so that the pin head orients with respect to the shoulder so as to interfere therewith in the event that one attempts to move the locking pin out of its assembled position by translation of the pin in a direction opposite to the first direction.

* * * * *